US012065589B2

United States Patent
Coroneo et al.

(10) Patent No.: US 12,065,589 B2
(45) Date of Patent: Aug. 20, 2024

(54) APPARATUS AND METHOD FOR APPLYING A FOAMING REACTION MIXTURE ONTO A LAMINATOR

(71) Applicant: Dow Global Technologies LLC, Midland, MI (US)

(72) Inventors: Mirella Coroneo, Correggio (IT); Roberto Rossi, Correggio (IT); Andrea Benvenuti, Correggio (IT)

(73) Assignee: Dow Global Technologies LLC, Midland, MI (US)

( * ) Notice: Subject to any disclaimer, the term of this patent is extended or adjusted under 35 U.S.C. 154(b) by 261 days.

(21) Appl. No.: 17/638,884

(22) PCT Filed: Aug. 14, 2020

(86) PCT No.: PCT/US2020/046289
§ 371 (c)(1),
(2) Date: Feb. 28, 2022

(87) PCT Pub. No.: WO2021/045888
PCT Pub. Date: Mar. 11, 2021

(65) Prior Publication Data
US 2022/0356382 A1 Nov. 10, 2022

(30) Foreign Application Priority Data
Sep. 2, 2019 (IT) .......................... 102019000015378

(51) Int. Cl.
*C09J 175/04* (2006.01)
*B29C 44/28* (2006.01)
(Continued)

(52) U.S. Cl.
CPC ............. *C09J 175/04* (2013.01); *B29C 44/28* (2013.01); *B29C 44/321* (2016.11);
(Continued)

(58) Field of Classification Search
CPC ...... C09J 175/04; B29C 44/321; B29C 44/28; B29C 44/461; B29C 44/52
See application file for complete search history.

(56) References Cited

U.S. PATENT DOCUMENTS 3,881,871 A  5/1975  Porter
5,958,991 A  9/1999  Bartlett
(Continued)

FOREIGN PATENT DOCUMENTS

EP  2631055 B  5/2016
GB  1197221 A  1/1970
(Continued)

OTHER PUBLICATIONS

Taverna et al., "Innovative Equipment for Automotive Seat Production", UTECH 2000.

*Primary Examiner* — Nathan T Leong (57) ABSTRACT

Laminated panels are made in a process whereby a starting foam formulation is processed through a mixhead, passed through a branched distribution system and dispensed through multiple outlets of the distribution system to produce a foam layer on a bottom facing layer. The foam layer is monitored for the presence of surface bubbles. When surface bubbles are observed, the backpressure in the mixhead is increased to reduce or eliminate the surface bubbles. An apparatus for performing the process includes an adjustment means at or upstream of a first branch point in the distribution system to increase or decrease the backpressure in the mixhead.

8 Claims, 6 Drawing Sheets (51) Int. Cl.
  *B29C 44/32* (2006.01)
  *B29C 44/46* (2006.01)
  *B29C 44/52* (2006.01)
  *B29K 75/00* (2006.01)

(52) U.S. Cl.
  CPC ............ *B29C 44/461* (2013.01); *B29C 44/52* (2013.01); *B29K 2075/00* (2013.01)

(56) References Cited

U.S. PATENT DOCUMENTS

| | | |
|---|---|---|
| 9,718,223 B2 | 8/2017 | Koster |
| 2010/0080900 A1* | 4/2010 | Geraedts ............... B29C 44/461 427/256 |
| 2014/0017412 A1 | 1/2014 | Schoen |
| 2017/0285619 A1 | 10/2017 | Brennan |

FOREIGN PATENT DOCUMENTS

| | | | |
|---|---|---|---|
| GB | 1197221 | * | 7/1970 |
| WO | 2008/18787 A | | 2/2008 |

\* cited by examiner

APPARATUS AND METHOD FOR APPLYING A FOAMING REACTION MIXTURE ONTO A LAMINATOR

This invention relates to apparatus and methods for producing laminated panel products having a facing layer and a polyurethane foam layer.

Single- and double-faced laminated panels are materials that include a polymer foam layer and a facing layer bonded to one or both sides of the foam layer. These products are useful as thermal insulation panels due to the insulating properties of the foam layer. The panels are useful in both industrial and residential applications. Specific uses include, for example, cold storages insulation, doors, windows and sliding shutters. The laminated panels are also useful as a construction or decorative panel even when thermal insulation properties are not needed. The panels are useful, for example, in constructing building facades.

The panels can be made industrially through a continuous or discontinuous process. A typical continuous process is commonly known as double band lamination. In this process, the components of the foam formulation are combined in a mixhead and the resulting foam formulation is transferred through a distribution system to multiple outlets, through which it is dispensed onto a bottom facing layer. The outlets are arranged across the width of the bottom facing layer, and are nowadays generally stationary. The bottom facing layer moves horizontally beneath the outlets. This motion produces from each outlet a strip of foam formulation on the bottom facing layer. The individual strips meet and combine to form a continuous layer.

The dispensed foam formulation cures on top of the bottom facing layer to form the polymer foam layer, which bonds to the bottom facing layer. A top facing layer is usually provided into the process to form a double-faced "sandwich" structure. In that case, the top facing layer also moves generally horizontally, parallel to and in the same direction as the bottom facing layer, to define a gap between the top and bottom facing layers. The foam formulation expands to fill that gap as it cures, thereby bonding to both of the facing layers. The gap between the top and bottom facing layers defines the thickness of the foam layer.

The foam formulations used in these applications are typically isocyanate-based systems that include a polyisocyanate, typically one or more polyols, one or more catalysts, one or more additives and one or more blowing agents. The blowing agent of choice is a volatile, physical blowing agent. In addition, a small amount of a gas such as air is often mixed into the foam formulation to provide bubble nucleation.

A common and persistent problem in this lamination process is the formation of bubbles at the top surface of the foam layer. These represent cosmetic and potentially structural defects. Their presence can adversely affect the thermal properties of the panel. Therefore it is desired to prevent these surface bubbles from forming, or at least minimize them.

Previous attempts to resolve this problem have focused on the design and operation of the distribution system and outlets, the general concept being to avoid splashing and entrainment of air as the foam formulation exits the outlets and impacts the bottom facing layer. This approach is only partially successful, since it can reduce and/or eliminate only bubbles forming by spashing. As a result, surface bubble formation can be reduced in some cases, but not eliminated.

It would be beneficial to provide a process in which the bubbles are further reduced and/or even eliminated. These bubbles are typically smaller than the bubbles forming during the splashing.

This invention is in one aspect a process for making a laminated panel, comprising I. combining components comprising at least one polyisocyanate, at least one physical blowing agent, at least one polyol and at least one catalyst in a mixing zone of a mixhead to form a reactive foam formulation;

II. continuously dispensing the reactive foam formulation onto a moving bottom facing layer to form a layer of reactive foam formulation on the bottom facing layer and III. curing the layer of reactive foam formulation on the bottom facing layer to form a laminated panel comprising the bottom facing layer and a polymer foam layer bonded to the bottom facing layer; and IV. observing the layer of reactive foam formulation and/or the polymer foam layer for the presence of surface bubbles on a top surface of the layer of the reactive form formulation and/or the polymer foam layer, and when surface bubbles are observed, increasing backpressure in the mixing zone of the mixhead to reduce or eliminate the further formation of surface bubbles.

Applicants have found that surface bubble formation in a lamination process is at least partially related to conditions that exist in the mixhead. Although the invention is not limited to any theory, it appears that at least some of the surface bubbles are produced due to separation and volatilization of part of the physical blowing agent from the remainder of the reactive foam formulation. This separation can take place in the mixing zone of the mixhead, producing pockets of blowing agent that produce surface bubbles when the reactive foam formulation is dispensed and formed into a layer on the moving facing layer. Applicants have further found that surface bubbles formed in this manner can be reduced or even eliminated by monitoring the process for their presence and, when such surface bubbles are detected, increasing backpressure in the mixing zone of the mixhead. This is believed to reduce the premature separation of physical blowing agent, leading to the decrease in surface bubble formation.

In a second aspect, this invention is an apparatus for forming and dispensing a fluid mixture, comprising:

a) a mixhead that includes:
  i) multiple inlets for the introduction of starting materials for mixing in the mixhead, the multiple inlets being in fluid communication with
  ii) a mixing zone in which starting materials introduced into the mixhead through the multiple inlets are combined to form a fluid mixture, the mixing zone being in fluid communication with
  iii) a mixhead outlet through which a fluid mixture formed in the mixing zone is removed from the mixhead, the mixhead outlet being in fluid communication with
b) a distribution system for distributing and dispensing a fluid mixture exiting the mixhead outlet, said distribution system including i) a conduit system including at least one branch point at which the conduit system is divided to define multiple flowpaths and ii) outlets at termini of the multiple flowpaths of the conduit system for dispensing the fluid mixture from the distribution system;

c) adjustable flow restriction means positioned downstream of the mixing zone of the mixhead and at or upstream of the at least one branch point of the conduit system, wherein the adjustable flow restriction means is operable to increase and decrease backpressure in the mixing zone of the mixhead.

The apparatus of the second aspect of the invention is suitable for use in the foregoing process for making laminated panels. The adjustable flow restriction means permits backpressure in the mixing zone of the mixhead to be increased or decreased rapidly and easily. When using this apparatus to make laminated panels, surface bubbles, when observed, can be reduced or eliminated easily by increasing back pressure via manipulation of the adjustable flow restriction means. Conversely, when surface bubbles are not observed (perhaps due to changing flowrates, formulation mixture, distributor operation design, or other reason), back pressure can be reduced by manipulating the adjustable flow restriction means, thereby maximizing mixing and providing other benefits. The adjustable flow restriction means therefore is a mechanism through which operating conditions can be optimized to minimize surface bubble formation in real time, during continuous operation.

Therefore, the invention is also a process for making a laminated panel, comprising
  I. continuously dispensing a reactive foam formulation onto a moving bottom facing layer through an apparatus of the second aspect of the invention by introducing component comprising at least one polyisocyanate, at least one physical blowing agent, at least one polyol, and at least one catalyst into the mixing zone of the mixhead, mixing the two streams in the mixing zone to form the reactive foam formulation and transferring the reactive foam formulation out of the mixhead outlet and then through the distribution system and out of the outlets of the distribution system onto the moving bottom facing layer to form a layer of reactive foam formulation on the bottom facing layer and
  II. curing the layer of reactive foam formulation on the bottom facing layer to form a laminated panel comprising the bottom facing layer and a polymer foam layer bonded to the bottom facing layer; and
  III. observing the layer of reactive foam formulation and/or the polymer foam layer for the presence of surface bubbles on a top surface of the layer of the reactive foam formulation and/or the polymer foam layer, and when surface bubbles are observed, increasing backpressure in the mixing zone of the mixhead through manipulation of the adjustable flow restriction means to reduce or eliminate the formation of surface bubbles.

Figure 1:
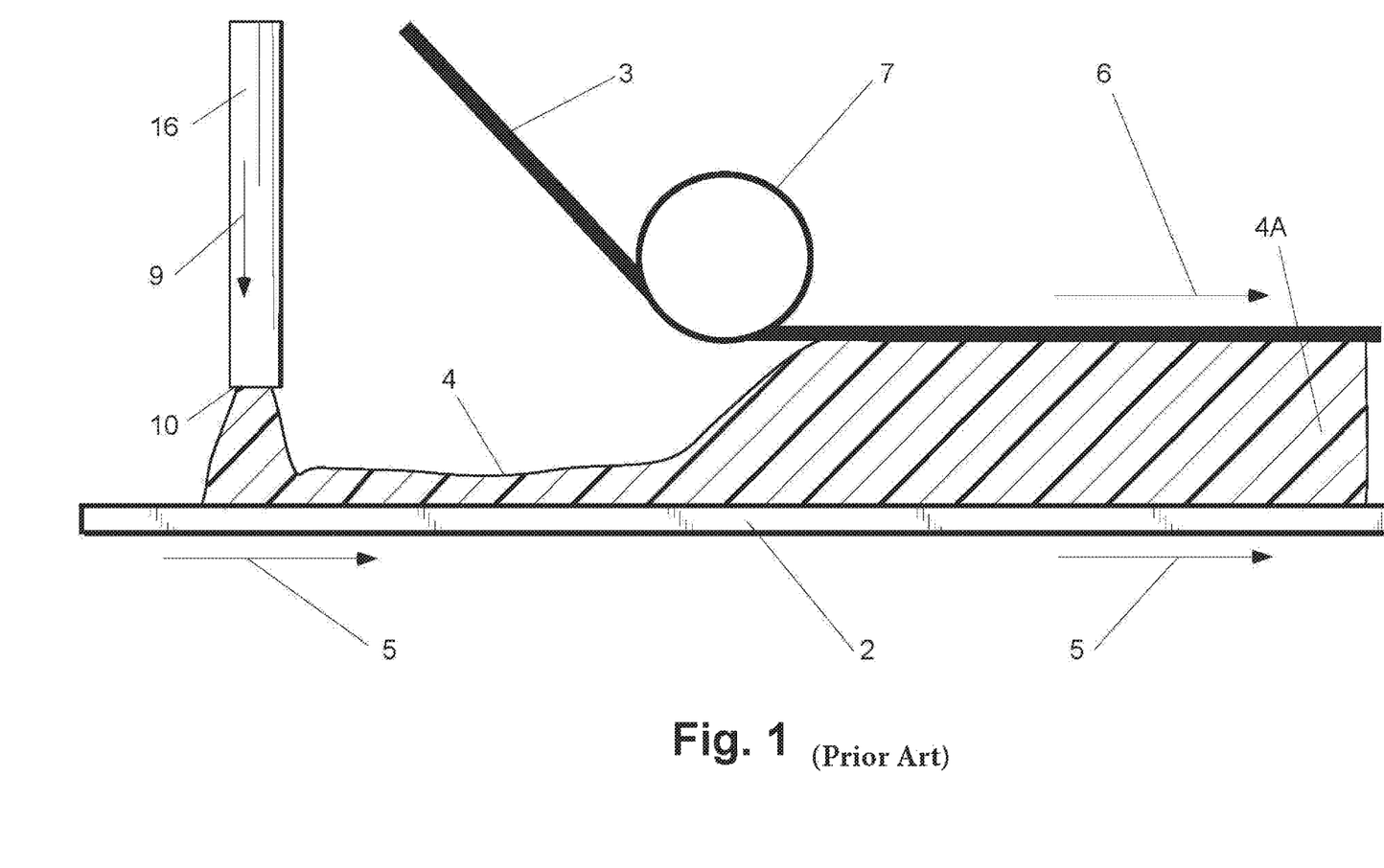
FIG. 1 is a schematic diagram of a double belt lamination process of the prior art.

Turning to FIG. 1, in a generic belt lamination process to be modified in accordance with this invention, bottom facing layer 2 travels substantially horizontally (for example, from zero to as much as ±25 degrees from the horizontal) in a direction indicated by arrows 5. Bottom facing layer 2 may be carried on a belt or other moving platform; may be attached to a tenter frame, may be pulled through the process using a winding roller or other apparatus, or is otherwise mechanically moved through the process.

Reactive foam formulation 4 is supplied via conduit 16 in the direction indicated by arrow 9 to outlet 10, where it is dispensed onto bottom facing layer 2 as bottom facing layer 2 travels in the indicated horizontal direction. For simplicity, only one outlet 10 is shown in FIG. 1; typically, however, a distributor defining multiple flowpaths is used and multiple such outlets are positioned across the width of bottom facing layer 2, each one applying a strip of reactive foam formulation. The strips combine to cover the entire upper surface of bottom facing layer 2 so as to form a continuous foam layer after expansion and curing has taken place. The "width" of bottom facing layer 2 is the horizontal dimension perpendicular to the direction of travel of bottom facing layer 2.

Upon being dispensed onto bottom facing layer 2, reactive foam formulation 4 is carried along with bottom facing layer 2, and expands upwardly to form layer 4A of reactive foam formulation 4. Optionally but preferably, top facing layer 3 is applied to the top surface of layer 4A of reactive foam formulation 4. When applied, top facing layer 3 preferably also travels in the direction indicated by arrow 6, i.e., in the same direction as bottom facing layer 2 travels, and preferably at the same linear speed. Top facing layer 3 can be moved through the process using any of the methods and apparatus as described above with regard to moving bottom facing layer 2.

As shown, the vertical distance between bottom facing layer 2 and top facing layer 3 is established mechanically, in this particular embodiment by passing top facing layer 3 under roller 7. Although only a single roller is shown, multiple rollers 7 may be present. In the double belt lamination process shown, the vertical distance so established defines the thickness of layer 4A of foam formulation 4, as foam formulation 4 expands upwardly until further upward expansion is constrained by top facing layer 3. Upon curing, layer 4A therefore has a thickness equal to the vertical distance between bottom facing layer 2 and top facing layer 3. Pressure may be applied to top facing layer 3 and to bottom facing layer 2, such as via a double belt or other mechanical means, or via air pressure, to maintain the desired spacing. A double belt laminator is an example of an apparatus suitable for performing the lamination process.

Figure 2:
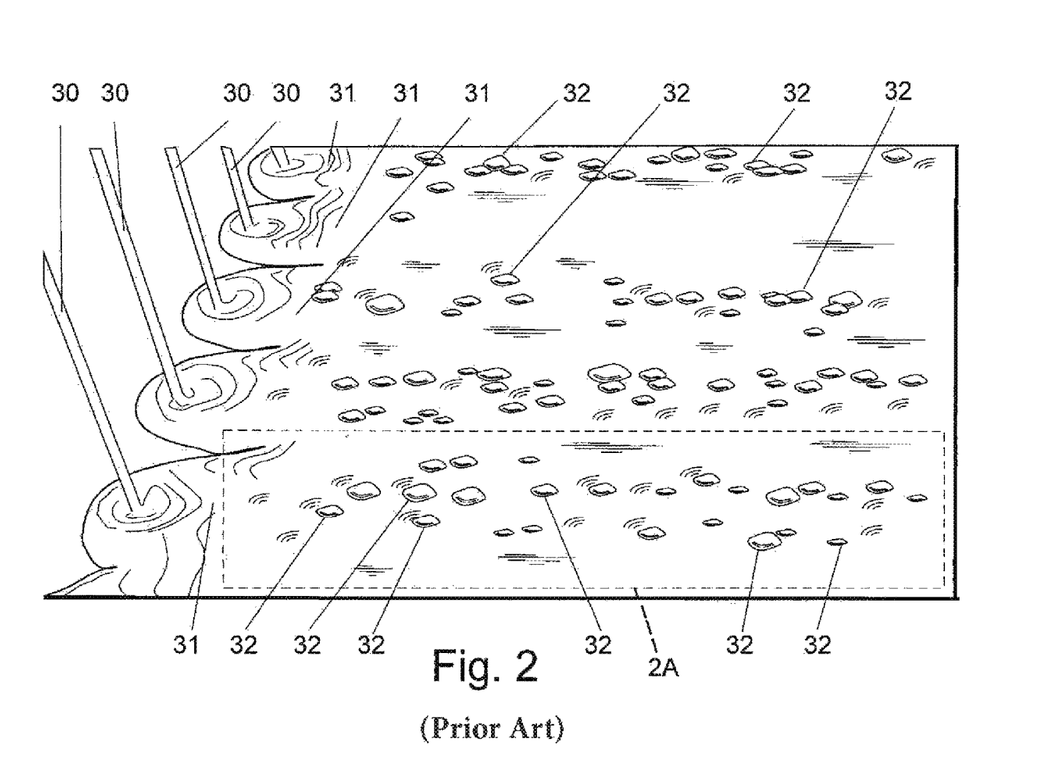
FIG. 2 is an isometric view showing surface bubble formation in a prior art double belt lamination process.

Turning to FIG. 2, jets 30 of reactive foam formulation, each having been ejected from a separate outlet 10 of a conventional distribution system, fall onto bottom facing layer 2, which is traveling as described with regard to FIG. 1. Each jet 30 of reactive foam formulation produces a corresponding strip 31 of reactive foam formulation on the top surface of bottom facing layer 2. Strips 31 combine to form a continuous layer of reactive foam formulation on the top surface of bottom facing layer 2. As shown in FIG. 2, surface bubbles 32 are present on the top surface of layer 4A of reactive foam formulation 4. Note that the surface bubbles 32 are different from the cells produced in the polymer foam after curing, in that they reside at the surface and have dimensions that may be 1 to 5 or more orders of magnitude larger than the cells. Surface bubbles 32 may have diameters of 100 μm or more and often 1 mm or more.

Figure 2A:
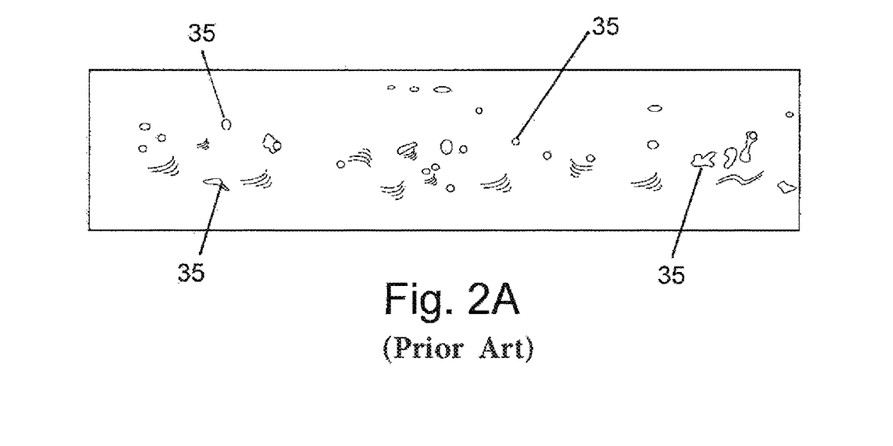
FIG. 2A is a photograph showing surface defects in a delaminated panel (after removing the top facing layer) arising from surface bubble formation in a prior art double belt lamination process shown in FIG. 2.

When the reactive foam formulation expands and cures, these surface bubbles produce defects in the resulting polymer foam layer. FIG. 2A illustrates the rectangular area indicated by box 2A of FIG. 2, after curing has taken place and the top facing layer has been removed. The polymer foam layer shown in FIG. 2A has surface defects 35 corresponding to the surface bubbles 32 shown in FIG. 2.

Figure 3:
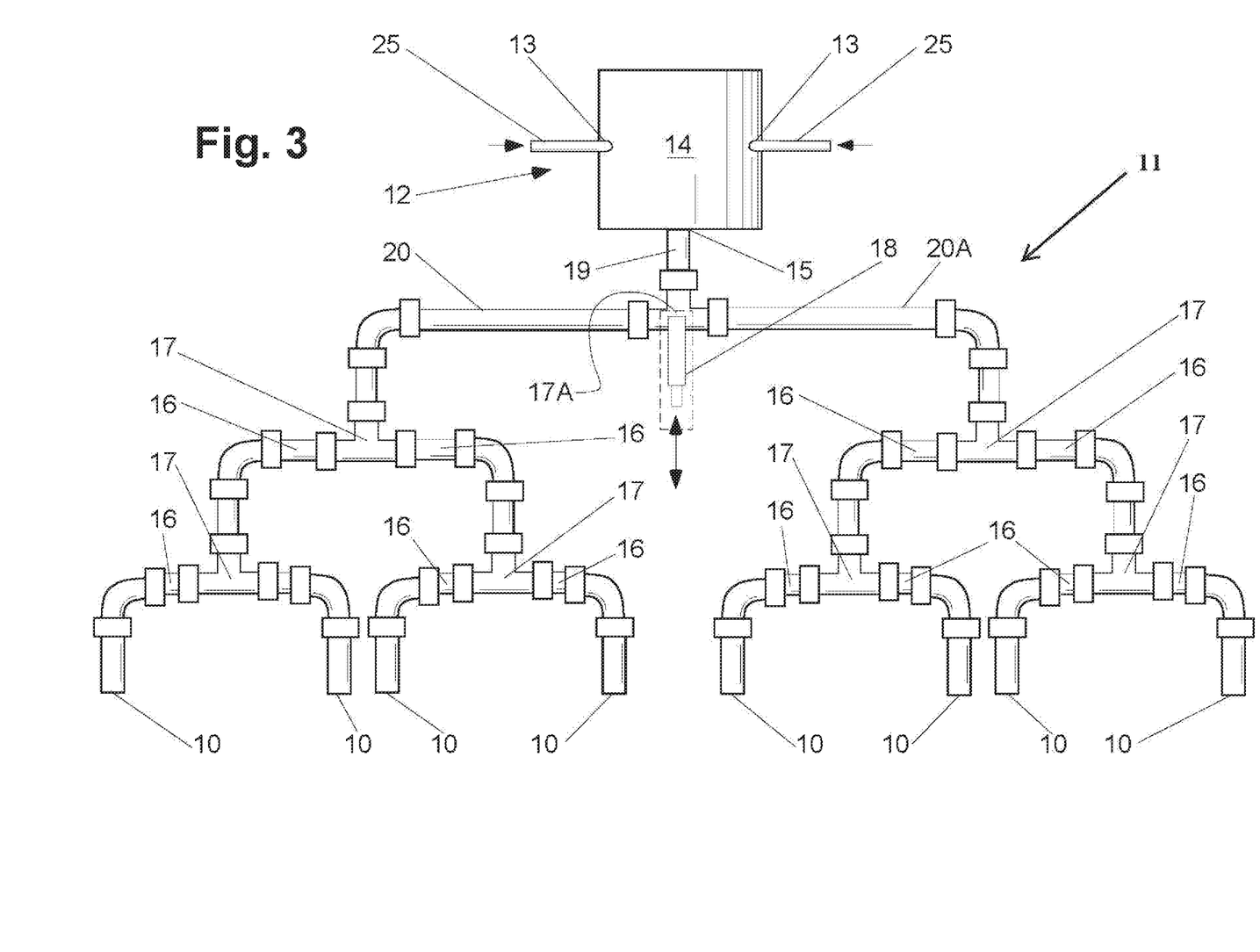
FIG. 3 is a front schematic view of an apparatus of the invention for forming and dispensing a fluid mixture.

Turning now to FIG. 3, an apparatus of the invention for forming and dispensing a fluid mixture includes mixhead 12. Mixhead 12 includes two or more inlets 13 for the introduction of starting materials that are to be combined in the mixhead to produce a fluid mixture such as a reactive foam formulation. In the embodiment shown, two inlets 13 are present, but any arbitrarily larger number of inlets 13 may be provided, depending on the requirements for the particular fluid mixture to be produced. Thus, 3, 4, 5, 6, 7, 8 or any larger number of inlets 13 may be provided.

As shown in FIG. 3, components introduced into mixhead 12 through inlets 13 are supplied via supply systems shown generally at reference numerals 25. Supply systems 25 may include various conduits, pumps, metering devices, storage devices, heating and/or cooling devices and other operational systems (including computerized operational systems) as may be useful or desired to deliver the respective components to mixhead 12 in correct ratios and under suitable temperature and/or pressure conditions. For impingement mixing within mixhead 12, for example, components may be delivered into mixhead 12 through inlets 13 at gauge pressures of 100 atmospheres (10.1 MPa) or more, such as from 125 to 200 atmospheres 12.7 to 20.2 MPa) or 130 to 160 atmospheres 13.2 to 16.2 KPa).

In this invention, the "fluid" mixture is a liquid or a liquid/gas mixture (sometimes referred to an "emulsion"); therefore, at least one of the starting materials introduced into mixhead 12 through an inlet 13 is a liquid under the operating conditions.

Each of multiple inlets 13 is in fluid communication with mixing zone 14 such that starting materials entering mixhead 12 through inlets 13 flow into mixing zone 14. Starting materials introduced into mixhead 12 through multiple inlets 13 are combined in mixing zone 14 to form a fluid mixture. Mixing zone 14 may contain various types of mixing elements, the selection of which is not considered critical to the invention. Mixing zone 14 usually contains impingement mixing elements, but may contain, for example, static mixing elements, centrifugal mixing elements, various types of agitators and the like, or any combination of two or more of such mixing elements. It is contemplated that the selection of mixing elements in any particular case will be made in accordance with the particular materials being mixed and the particular mixing requirements for any specific application.

Mixing zone 14 is in fluid communication with mixhead outlet 15, such that the fluid mixture produced in mixing zone 14 is discharged from mixhead 12 via mixhead outlet 15.

Mixhead outlet 15 is in fluid communication with distribution system 11 such that the fluid mixture discharged from mixhead 12 via mixhead outlet 15 flows into distribution system 11. Distribution system 11 distributes the fluid mixture produced in mixhead 12 to multiple outlets 10 from which the fluid mixture is dispensed. Distribution system 11 includes a conduit system, which in the embodiment shown in FIG. 3 includes multiple conduits 16, 19, 20 and 20A that collectively form multiple flowpaths from mixhead outlet 15 to each of outlets 10 such that a fluid mixture exiting mixhead 12 via mixhead outlet 15 is conducted through distribution system 11 to outlets 10, from which it is dispensed.

The conduit system includes at least one branch point at which the conduit system is divided to define the multiple flowpaths. Seven such branch points (including first branch point 17A and downstream branch points 17) are arbitrarily illustrated in the embodiment shown in FIG. 3, at each of which an incoming stream of fluid mixture is divided into two or more streams. The conduit system may include as few as one such branch point and any arbitrarily larger number thereof, such as at least 2, at least 3, at least 4, at least 5, at least 7, at least 10, at least 15 or at least 31 and, for example, up to 100, up to 50 or up to 25 branch points. A "branch point" for purposes of this invention is simply a point within the conduit system at which the fluid mixture or portion thereof is divided into two or more streams as it passes through the conduit system. No particular apparatus is required provided that the fluid mixture is divided into multiple flowpaths as it passes through the conduit system. In the embodiment shown in FIG. 3, the conduit system of distribution system 11 takes the form of pipes or tubes joined at the various branch points.

The number of flowpaths into which the fluid mixture is divided within distribution system may be as few as 2 and can be any arbitrarily larger number, such as at least 2, at least 3, at least 4, at least 5, at least 7, at least 8, at least 10, at least 16 or at least 32, and, for example, up to 100, up to 50 or up to 25.

Distribution system 11 further includes outlets 10 at the termini of the multiple flowpaths of the conduit system for dispensing the fluid mixture from distribution system 11. Outlets 10 may be simple openings, and/or may be take the form of nozzles and/or valves or other suitable apparatus.

As is true with regard to the number of branches and flowpaths, the number of outlets may be as few as 2 and can be any arbitrarily larger number, such as at least 2, at least 3, at least 4, at least 5, at least 7, at least 8, at least 10, at least 16 or at least 32, and, for example, up to 100, up to 50 or up to 25. In FIG. 3, the number of flowpaths and outlets 10 are arbitrarily shown as being 8 in number.

Outlets 10 may be arranged in a straight line, a staggered configuration, or other useful configuration.

Useful distribution systems include, for example, a distributor bar as described in US Published Patent Application No. 2014/00417412, a rake-type distributor bar as described in US Published Patent Application No. 2017/0285619 and/or US 2010/0080900, a jointed casting rake/accommodation element assembly as described in U.S. Pat. No. 9,718,223, an apparatus as described in German Utility Model 20 2011 001 109 U1 and/or 20 2009 015 838U1, or an apparatus as described in WO 2008/018787.

Turning back to FIG. 3, the apparatus of the invention further includes adjustable flow restriction means 18. Adjustable flow restriction means 18 is positioned downstream of mixing zone 14 of mixhead 12, and at or upstream of the first branch point of the conduit system downstream of mixing head 12 (17A in FIG. 3). Thus, adjustable flow restriction means 18 may be positioned, for example, at mixhead outlet 15, or within any portion of the distribution system 11 up to the first branch point (or only branch point if only one is present). The "first" branch point is the first branch point downstream from mixhead 12, "downstream"

referring to the direction of flow of the fluid mixture from mixhead 12 through distribution system 11 toward outlets 10.

Adjustable flow restriction means 18 is operable to increase and decrease backpressure in mixing zone 14 of first mixhead 12. Adjustable flow restriction means 18 accomplishes this by restricting the flow of the fluid mixture past adjustable flow restriction means 18 (to increase backpressure in mixing zone 14 of mixhead 12) or by increasing such flow (to decrease backpressure in mixing zone 14 of mixhead 12). The flow of fluid mixture through distribution system 11 is restricted by adjustable flow restriction means 18 by adjusting it such that it diminishes the cross-sectional area of flow path at the location of the adjustable flow restriction means 18. Conversely, the pressure losses experienced by the fluid mixture through distribution system 11 are decreased by adjustable flow restriction means 18 by adjusting it such that it enlarges the cross-sectional area of the flow path at the location of adjustable flow restriction means 18.

Figure 4:
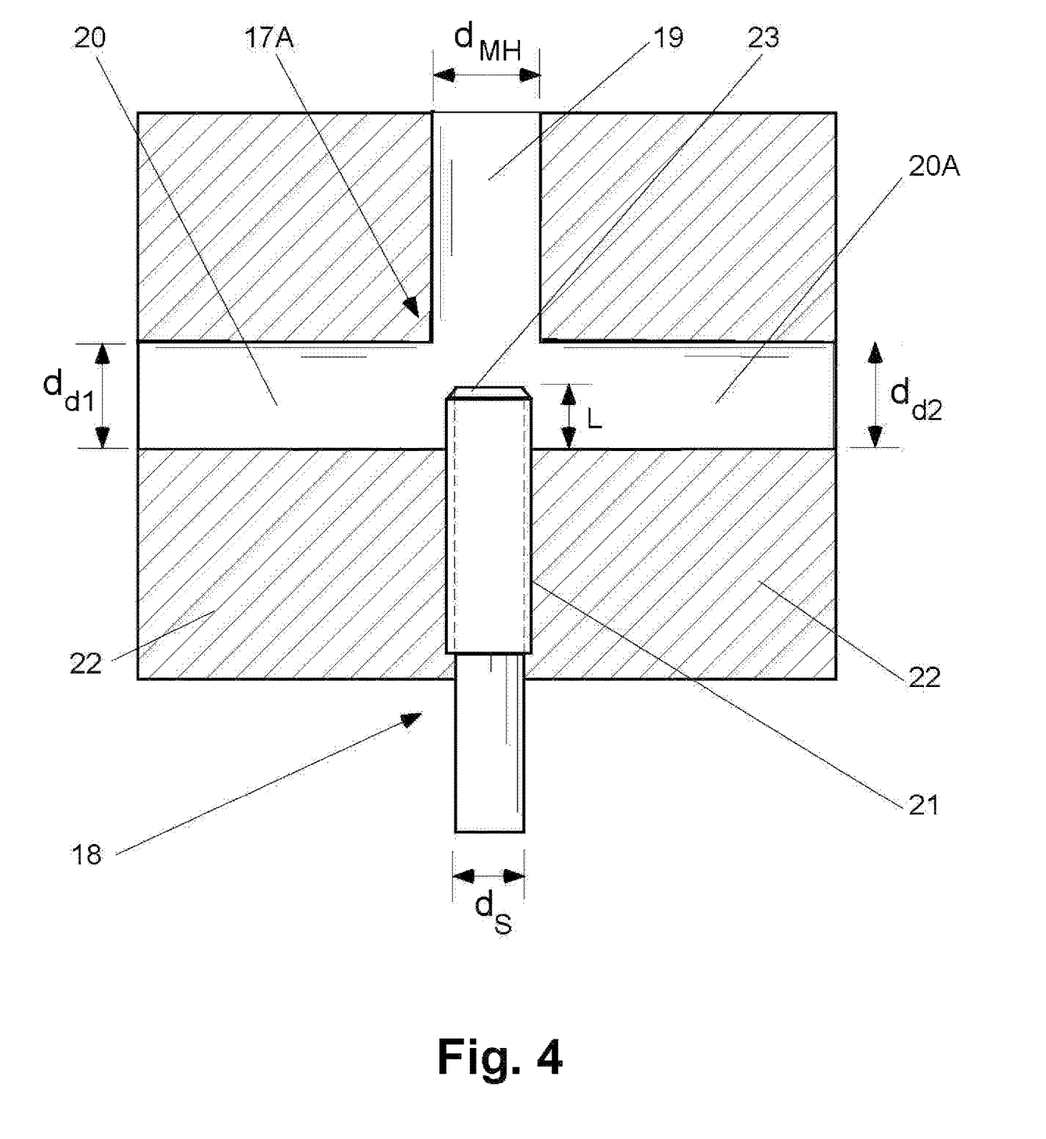
FIG. 4 is an enlarged front sectional view of an embodiment of an adjustable flow restriction means for use in the invention.

In the embodiment shown in FIGS. 3 and 4, adjustable flow restriction means 18 is positioned at first branch point 17A of distribution system 11.

As shown in FIGS. 3 and 4, adjustable flow restriction means 18 in some embodiments takes the form of an adjustment screw such as adjustment screw 21. Adjustment screw 21 penetrates into distribution system 11 at (in the embodiment shown) or upstream of first branch point 17A of the conduit system, where (in the embodiment shown) conduits 20 and 20A meet conduit 19.

As shown in more detail in FIG. 4, first branch point 17A of the conduit system may include block housing 22 at which conduits 19, 20 and 20A are assembled to form first branch point 17A. As shown, conduits 19, 20 and 20A form a T-junction, although other geometric arrangements can be selected. Block housing 22 and adjustment screw 21 are reciprocally threaded so adjustment screw 21 can be turned to insert it into or withdraw it from block housing 22.

By turning adjustment screw 21 in the proper direction, distal end 23 and a portion of the body of adjustment screw 21 is moved into the flow path defined by conduits 19, 20 and 20A, thereby restricting the flow of the fluid mixture past adjustment screw 21 and increasing backpressure upstream in mixhead 12. Conversely, turning adjustment screw 21 in the opposite direction causes distal end 23 and the body of adjustment screw 21 to withdraw partially or entirely from that flow path, reducing or eliminating the restriction and thereby decreasing backpressure upstream in mixhead 12.

Many other types of adjustable flow restriction means can be used in addition to or instead of adjustment screw 21. Adjustable flow restriction means 18 may, for example, comprise a pin arrangement, in which the pin can be inserted at various depths into distribution system 11 to restrict the flow of the fluid mixture and thus adjust mixhead backpressure. A butterfly, iris, knife or other type of valve may incorporated into mixhead 12 downstream of mixing zone 14, and/or into distribution system 11 (at or upstream of the first branch point), to adjust flow and thereby adjust mixhead back pressure. Another alternative adjustable flow restriction means includes, for example, apparatus for squeezing conduit 19 (or some portion thereof) or other portion of distribution system 11 at or upstream of the first branch point, to diminish the internal flow path and increase back pressure. An adjustable band, for example, can be used to perform the squeezing step. In this last embodiment, conduit 19 or other squeezed portion should be made of a flexible material which can be compressed to narrow its internal flow path and which re-expands when the compressive force is released.

In another type of adjustable flow restriction means, a portion of distribution system 11, at or upstream of the first branch point, is constructed of a material that changes shape in response to an external input, such as a magnetorestrictive material, an electroactive material, a pH sensitive material. In such a case, adjustable flow restriction means 18 includes such portion of distribution system 11 plus corresponding external input means to effect the shape change which adjusts the flow path and accordingly adjusts mixhead backpressure.

Operation of adjustable flow restriction means 18 can be performed manually or through a suitable automated system. Such an automated system may be adapted to monitor one or more operating parameters of the apparatus of the invention (in particular the presence of surface bubbles on layer 4A of reactive foam formulation 4, and/or of any upstream and/or downstream apparatus, and adjust mixhead backpressure through manipulation of adjustable flow restriction means 18.

The apparatus of the invention is useful in any process in which starting materials are combined to form a fluid mixture which is then distributed to multiple outlets. An example of such a process is a laminated panel manufacturing process, such as one of the general type illustrated in FIG. 1. In the laminated panel manufacturing process, the apparatus of this invention is used to combine starting materials to form a reactive foam formulation (i.e., a fluid mixture) which is then dispensed onto a bottom facing layer 2 as discussed above, where it cures to form a polymer layer adhered to bottom facing layer 2. A top facing layer may be added in the manner described before to form a sandwich panel. Outlets 10 of distribution system 11 are generally oriented transverse to the direction of movement of bottom facing layer 2, i.e., across its width. As discussed before, the movement of bottom facing layer 2 as reactive foam formulation 4 is dispensed through outlets 10 forms parallel strips of reactive foam formulation 4 on bottom facing layer 2. The spacing of outlets 10 is advantageously selected together with flow rates through outlets 10 and line speed (i.e., the linear speed at which bottom facing layer 2 moves past outlets 10) such the individual strips of reactive foam formulation 4 combine to form a continuous layer of reactive foam formulation on the top surface of bottom facing layer 2.

In a particular embodiment of a laminated panel manufacturing process, reactive foam formulation is dispensed onto a moving bottom facing layer by introducing components comprising at least one polyisocyanate, at least one physical blowing agent, at least one polyol and at least one catalyst through the multiple inlets 13 of mixhead 12, into mixing zone 14 of mixhead 12. There the components are combined to form reactive foam formulation 4. Reactive foam formulation 4 is then transferred through distribution system 11 and out of outlets 10 onto moving bottom facing layer 2 to form a layer 4A of reactive foam formulation 4 on bottom facing layer 2. Layer 4A of reactive foam formulation 4 is then cured to form a polymer foam layer on top of and bonded to bottom facing layer 2. When top facing layer 3 is applied the top surface of layer 4A of reactive foam formulation 4 as described above with regard to FIG. 1, a sandwich structure is produced.

The various components of the reactive foam formulation can be introduced into mixhead 12 individually or as various subcombinations. Typically, the polyisocyanate is introduced into mixhead 12 through one inlet 13, and the polyol is introduced into mixhead 12 through at least one other inlet 13. The remaining components can be introduced into mixhead 12 separately, through additional inlets 13, and/or can be introduced together with the polyol. In some embodiments, the physical blowing agent is combined with the polyol upstream of mixhead 12 and introduced into mixhead 12 together with the polyol. The catalyst (and/or other optional ingredients such as a surfactant) can be introduced into mixhead 12 in a similar manner if desired. It is also possible to introduce the catalyst and/or optional ingredients (if any) by combining them with the polyisocyanate upstream of mixhead 12 and introducing them together with the polyisocyanate.

A nucleating gas such as air, nitrogen, hydrogen or argon may be introduced into mixhead 12, separately through its own inlet 13 and/or as a mixture with one or more of the other components, notably the polyol.

In a particular laminated panel manufacturing process, the physical blowing agent and nucleating gas (if used) are continuously mixed with the polyol upstream of mixhead 12 and the resulting polyol/physical blowing agent/nucleating gas mixture is introduced into mixhead 12 together through a single inlet 13. The polyisocyanate is introduced into mixhead 12 through another inlet 13. In such embodiments the catalyst and optional ingredients (if any) can be introduced individually and/or pre-combined with each other, the polyol/physical blowing agent/nucleating gas mixture, and/or the polyisocyanate.

In one aspect of a laminated panel manufacturing process of the invention, layer 4A of reactive foam formulation 4 and/or the polymer foam layer formed upon curing layer 4A, is observed for the presence of surface bubbles. This can be done during the manufacturing process itself, i.e., during the step of forming layer 4A by dispensing reactive foam formulation 4 onto bottom facing layer 2, and/or the step of curing layer 4A. Alternatively (or in addition), this can be done by examining finished laminated panels produced in the process. The process of observing can be done visually, such as by a human observer (by removing top layer facing if one is present). The observation process can be performed visually or otherwise using suitable automated equipment adapted to detect the presence of the surface bubbles. In this aspect of the invention, when surface bubbles are observed, backpressure in the mixing zone of the mixhead is increased to reduce or eliminate the further formation of surface bubbles. Using the apparatus of this invention, the increase in backpressure is accomplished by manipulation of the adjustable flow restriction means as described before.

Layer 4A of reactive foam formulation 4 is cured on the bottom facing layer to form a laminated panel comprising the bottom facing layer and a polymer foam layer bonded to the bottom facing layer. In cases in which a sandwich structure is produced, the polymer foam layer also becomes bonded to the top facing layer.

Curing conditions are selected such that the blowing agent volatilizes and the reactive components of the reactive foam formulation react to produce a polymer foam. The conditions typically include a temperature above the boiling temperature of the physical blowing agent at the pressures employed. The polyisocyanate and polyol(s) typically will react spontaneously when mixed, even at room temperature, and the exothermic heat of reaction is often sufficient to produce the temperature needed to volatilize the physical blowing agent. Therefore, it is often necessary only to produce the reactive foam formulation and form it into a layer on the bottom facing sheet at or about room temperature, such as 10 to 35° C., and allow the reaction to complete without further applied heat. However, if desired, the components of the reactive foam formulation can be heated at the time of or prior to combining them and/or at the time of or after forming the reactive foam formulation into a layer on the bottom facing sheet. The elevated temperature may be, for example, 35 to 100° C. Metal facings are also typically heated between 20° C. and 80° C. in order to increase the adhesion of the foam to the metal facings. The process of forming the laminated panel may be performed on a heated conveyor, such as a double band laminator in which one or both of the bands are heated, to provide a suitable curing temperature.

The process of the invention may and preferably does include various additional steps (and associated apparatus) as are needed to produce a laminated panel product. The facing layers, particularly metal ones, may be pre-treated to promote good adhesion to the polymer foam or otherwise to facilitate panel manufacture. Examples of pre-treatment steps include decoiling, corona discharge treatment, profiling, heating to the process temperature, and application of a layer of an adhesion promoter.

Similarly, the process may and preferably does include one or more downstream steps, such as cutting the laminated panel to a desired length, cooling the laminated panel from the curing temperature, stacking the laminated panels, and wrapping the laminated panels or otherwise preparing them for shipment or storage.

Suitable organic polyisocyanates for use in a laminated panel manufacturing process of the invention include aliphatic, cycloaliphatic, araliphatic or aromatic polyisocyanates, or combinations of any two or more thereof. Such may include, for example, alkylene diisocyanates, particularly those having from 4 to 12 carbon atoms in the alkylene moiety, such as 1,12-dodecane diisocyanate, 2-ethyltetramethylene 1,4-diisocyanate, 2-methyl-pentamethylene 1,5-diisocyanate, 2-ethyl-2-butylpentamethylene 1,5-diisocyanate, tetramethylene 1,4-diisocyanate and preferably hexamethylene 1,6-diisocyanate; cycloaliphatic diisocyanates such as cyclohexane 1,3- and 1,4-diisocyanate and any mixture of these isomers, 1-isocyanato-3,3,5-trimethyl-5-isocyanato-methylcyclohexane (isophorone diisocyanate), 2,4- and 2,6-hexahydrotoluene diisocyanate and mixtures of those isomers, 4,4'-, 2,2'- and 2,4'-dicyclohexylmethane diisocyanate and mixtures of those isomers, araliphatic diisocyanates such as 1,4-xylylene diisocyanate and mixtures of those xylylene diisocyanate isomers, and preferably aromatic diisocyanates and polyisocyanates, such as 2,4- and 2,6-toluene diisocyanate and mixtures of those isomers, 4,4'-, 2,4'- and 2,2'-diphenylmethane diisocyanate and mixtures of those isomers, mixtures of 4,4'- and 2,4'-diphenylmethane diisocyanates, polyphenyl-polymethylene polyisocyanates, mixtures of 4,4'-, 2,4'- and 2,2'-diphenylmethane diisocyanates and polyphenylpolymethylene polyisocyanates (crude MDI), and mixtures of crude MDI and toluene diisocyanates. Modified polyisocyanates, i.e., products which are obtained by chemical reaction of organic diisocyanates and/or polyisocyanates, may also be used. Specific examples are ester-, urea-, biuret-, allophanate-, uretoneimine-, carbodiimide-, isocyanurate-, uretdione- and/or urethane-containing diisocyanates and/or polyisocyanates, that contain from 33.6 to 15 percent by weight, preferably from 31 to 21 percent by weight, of isocyanate groups, based on the total weight of the modified polyisocyanate. The organic polyisocyanates may be employed individually or in the form of combinations thereof.

The reactive foam formulation typically includes at least one polyol, i.e., a compound having two or more hydroxyl groups. A wide range of polyols can be used, depending in part on the desired properties of the polymer foam. Useful polyols therefore include polyether polyols, polyester polyols, hydroxyl-terminated polybutadiene rubbers, polyacrylate polyols and polycarbonate polyols, as well as other types. Useful polyols have hydroxyl equivalent weights of about 30 to 3000; however for laminate panel production it is preferred to use at least one polyol having a hydroxyl equivalent weight of 30 to 1000, especially 125 to 560. The polyols may have hydroxyl functionalities of 2 to 8 or more hydroxyl groups per molecule.

Useful polyether polyols include ethoxylates and/or propoxylates of one or more hydroxyl- and/or amine group containing starters that have an equivalent weight of 30 to 59, including, for example, one or more of ethylene glycol, diethylene glycol, triethylene glycol, 1,2-propane diol, 1,3-propanediol, dipropylene glycol, tripropylene glycol, glycerin, trimethylolpropane, trimethylolethane, neopentyl glycol, 1,6-hexanediol, 1,4-cyclohexanedimethanol, 1,2,6-hexanetriol, monoethanolamine, diethanolamine, triethanolamine, pentaerythritol, erythritol, sorbitol, sucrose, mannitol, N,N,N',N'-tetrakis(2-hydroxypropyl)-ethylenediamine, diethyl toluenediamine, dimethylthiotoluenediamine and combinations thereof.

Useful polyester polyols may be reaction products of, for example, an organic dicarboxylic acid (or corresponding acid anhydridesor ester) having about 2 to about 12 carbon atoms with a polyhydric alcohol, preferably a diol and/or triol having 2 to 12 carbon atoms, preferably from 2 to 6 carbon atoms. Examples of suitable dicarboxylic acids are succinic acid, glutaric acid, adipic acid, suberic acid, azelaic acid, sebacic acid, decanedicarboxylic acid, maleic acid, fumaric acid, and preferably orthophthalic acid, isophthalic acid, terephthalic acid and the isomeric naphthalene-dicarboxylic acids. The dicarboxylic acids may be used either individually or mixed with one another. Examples of dihydric and polyhydric alcohols used to make the polyester polyol are ethanediol, diethylene glycol, 1,2- and 1,3-propanediol, dipropylene glycol, 1,4-butanediol, 1,5-pentanediol, 1,6-hexanediol, 1,10-decanediol, glycerol, trimethylolpropane. Also useful are modified aromatic polyester polyols such as described in U.S. Pat. No. 6,359,022, which contain one or more pendant aliphatic hydrocarbyl groups that have 6 or more carbon atoms in a straight or branched chain.

Furthermore, polyester polyols made from lactones such as ε-caprolactone or hydroxycarboxylic acids such as ω-hydroxycaproic acid and hydrobenzoic acid may also be employed. Hybrid polyether-polyester polyols such as are described, for example, in WO 2011/137011 are also useful.

Other useful polyols include compounds having 2 to 8 hydroxyl groups, equivalent weights of up to 125 and molecular weights up to 200, such as ethylene glycol, diethylene glycol, triethylene glycol, 1,2-propane diol, 1,3-propanediol, dipropylene glycol, tripropylene glycol, glycerin, trimethylolpropane, trimethylolethane, neopentyl glycol, 1,6-hexanediol, 1,4-cyclohexanedimethanol, 1,2,6-hexanetriol, mannitol, sucrose and sorbitol.

The physical blowing agent is one or more compounds that have boiling temperatures (at 1 atmosphere pressure) of 10° C. to 80° C., preferably 10° C. to 50° C., and which lack hydroxyl, primary and/or secondary amine, thiol, carboxyl or other groups other than halogen groups that are reactive toward isocyanate groups under the conditions of the curing reaction. Useful physical blowing agents include hydrocarbons, hydrofluorocarbons, hydrochlorocarbons, hydrofluorochlorocarbons, ethers and the like that have the aforementioned boiling temperatures. $C_4$-$C_6$ hydrocarbons such as any isomer (or mixture of isomers) of butane, pentane and hexane are particularly useful. Also useful are hydrofluoroolefins and hydrofluorochloroolefins such as described, for example, in US 2007/0100010. Specific examples thereof are trifluoropropene, 1,3,3,3-tetrafluoropropene (1234ze), 1,1,3,3-tetrafluoropropene, 2,2,3,3-tetrafluoropropene (1234yf), 1,2,3,3,3-pentafluoropropene (1225ye), 1,1,1-trifluoropropene, 1,1,1,3,3-pentafluoropropene (1225zc), 1,1,2,3,3-pentafluoropropene (1225yc), (Z)-1,1,1,2,3-pentafluoropropene (1225yez), 1-chloro-3,3,3-trifluoropropene (1233zd) and 1,1,1,4,4,4-hexafluorobut-2-ene (1336mzzm). Mixture of any two or more physical blowing agents can be used.

The invention is particularly applicable to cases in which the physical blowing agent is present in an amount of at least 12 parts by weight per 100 parts by weight of the polyol(s). The amount of physical blowing agent may be, for example, at least 12, at least 14 or at least 15 parts by weight on that basis and may be, for example, up to 25 parts, up to 22 parts, up to 20 parts or up to 18 parts, again on the same basis. Similarly, the invention is particularly applicable when the blowing agent has limited miscibility in the polyol(s) at the relative proportions thereof that are present in the reactive foam formulation. Immiscibility can be evaluated by forming a mixture of the polyol(s) and physical blowing agent in the relevant proportions and observing whether phase separation takes place upon standing at room temperature (23±2° C.).

The catalyst is a material that catalyzes the curing of the reactive foam formulation. Preferred catalysts include urethane catalysts, i.e., a catalyst for the reaction of an alcohol group and/or water with an isocyanate group, isocyanate trimerization catalysts, and carbodiimide catalysts. Among suitable urethane catalysts are tin (II) and tin (IV) catalysts, catalysts that contain other Group III to Group XV metals; tertiary amine compounds, amidines, tertiary phosphines, and the like. Useful isocyanate trimerization catalysts include strong bases such as alkali metal phenolates, alkali metal alkoxides, alkali metal carboxylates, quaternary ammonium salts, and the like. Useful carbodiimide catalysts include phospholene oxides such as 3-methyl-1-phenyl-2-phospholene oxide (MPPO), 3-methyl-1-ethyl-2-phospholene oxide (MEPO), 3,4-dimethyl-1-phenyl-3-phospholene oxide, 3,4-dimethyl-1-ethyl 3-phospholene oxide, 1-phenyl-2-phospholen-1-oxide, 3-methyl-1-2-phospholen-1-oxide, 1-ethyl-2-phospholen-1-oxide, 3-methyl-1-phenyl-2-phospholen-1-oxide, and 3-phospholene isomers thereof.

The reactive foam formulation may further contain various optional ingredients. A foam-stabilizing surfactant is a useful optional ingredient. Suitable such surfactants include, but are not limited to, silicones such as silicone oils and organosilicone-polyether copolymers, including polydimethyl siloxane and polydimethylsiloxane-polyoxyalkylene block copolymers. Other suitable surfactants include organic surfactants such as nonylphenol ethoxylates and ethylene oxide/butylene oxide block co-polymers.

Another optional ingredient is a flame retardant, such as a phosphorus-containing flame retardant, a halogenated flame retardant and melamine.

Water is another optional ingredient that, when present, reacts to produce carbon dioxide and provide auxiliary blowing.

In addition to the foregoing components, the formulated polyol composition or reaction mixture may contain one or more fillers and/or reinforcing agents such as fiber glass, carbon fibers, flaked glass, mica, talc, and calcium carbonate; one or more pigments and/or colorants such as titanium dioxide, iron oxide, chromium oxide, azo/diazo dyes, phthalocyanines, dioxazines and carbon black; one or more biocides; one or more preservatives; one or more antioxidants; and the like.

The top and bottom facing of a laminated panel made in accordance with the invention each independently can be, for example, a metal, kraft or other paper, a fiber-reinforced paper, a metal foil-paper composite layer, a plastic sheet or film, or the like. In cases in which the facings are flexible (as is the case with paper, plastic sheets and films and metal foils, for example) the laminated panel is sometimes referred to as "insulating board". The term "laminated panel" is used herein to encompass panels made with rigid facings (such as metal sheets) as well as those made with flexible facings, which are often referred to in the art as "insulating board". Each facing layer preferably has a thickness of at most 5 mm, preferably up to 2.5 mm or up to 1 mm.

The foam layer of a laminated panel made in accordance with the invention may have a foam density of, for example, 20 to 120 kg/m$^3$ or 30 to 80 kg/m$^3$ as measured according to ASTM 1622-88. The cells may be at least about 70 percent closed, at least about 80 percent closed or at least about 85 percent closed.

Laminate panels made in accordance with the invention can be used in the same manner and for the same purposes as laminate panels made using conventional processes. The panels can be used as thermal insulation for buildings, vehicles, pavement and other constructions. Specific uses include cold stores insulation, doors, windows and sliding shutters. The panels are useful as lightweight decorative panels for building facades, interior wall partitions, and other uses.

The following example is provided to illustrate the invention but is not intended to limit the scope thereof. All parts and percentages are by weight unless otherwise indicated.

An apparatus as generally described in FIG. 3 is used to mix and dispense a reactive foam formulation in a lamination process as described generally in FIG. 1. Distribution system 11 consists of 8 mm internal diameter tubes connected at T-junctions to produce a tree-structure having 8 flowpaths and 8, 8-mm diameter openings.

An adjustable flow restriction means, consisting of a threaded adjustment screw and reciprocating threads in block 22, is positioned at first branch point 17A of distribution system 11 at a T-junction as shown generally in FIG. 4. Referring to FIG. 4, the diameter $d_{MH}$ of conduit 19 is 6 mm Diameters $d_{d1}$ and $d_{d2}$ of conduits 20 and 20A are each 8 mm. The diameter $d_s$ of threaded adjustment screw 21 is 5 mm.

Mixhead 12 has two inlets 13. A polyisocyanate is continuously pumped into one of the inlets. A formulated polyol containing a polyol, urethane catalyst and silicone foam-stabilizing surfactant is fed continuously into the other inlet 13 after being combined in-line with 16 parts of n-pentane per 100 parts of formulated polyol and 1 NL/minute of nucleation air. The two streams entering mixhead 12 through inlets 13 are combined in mixing zone 14 of mixhead and the resulting fluid mixture is discharged out of mixhead 12 through mixhead outlet 15 and into distribution system 11. The continuous flowrate out of mixhead outlet 15 is 14 kg/minute. The fluid mixture then travels through the distribution system and is discharged through outlets 10 onto a moving metal facing layer. Adjustment screw 21 is positioned such that its distal end 23 does not penetrate into conduits 19, 20 or 20A.

Figure 5:
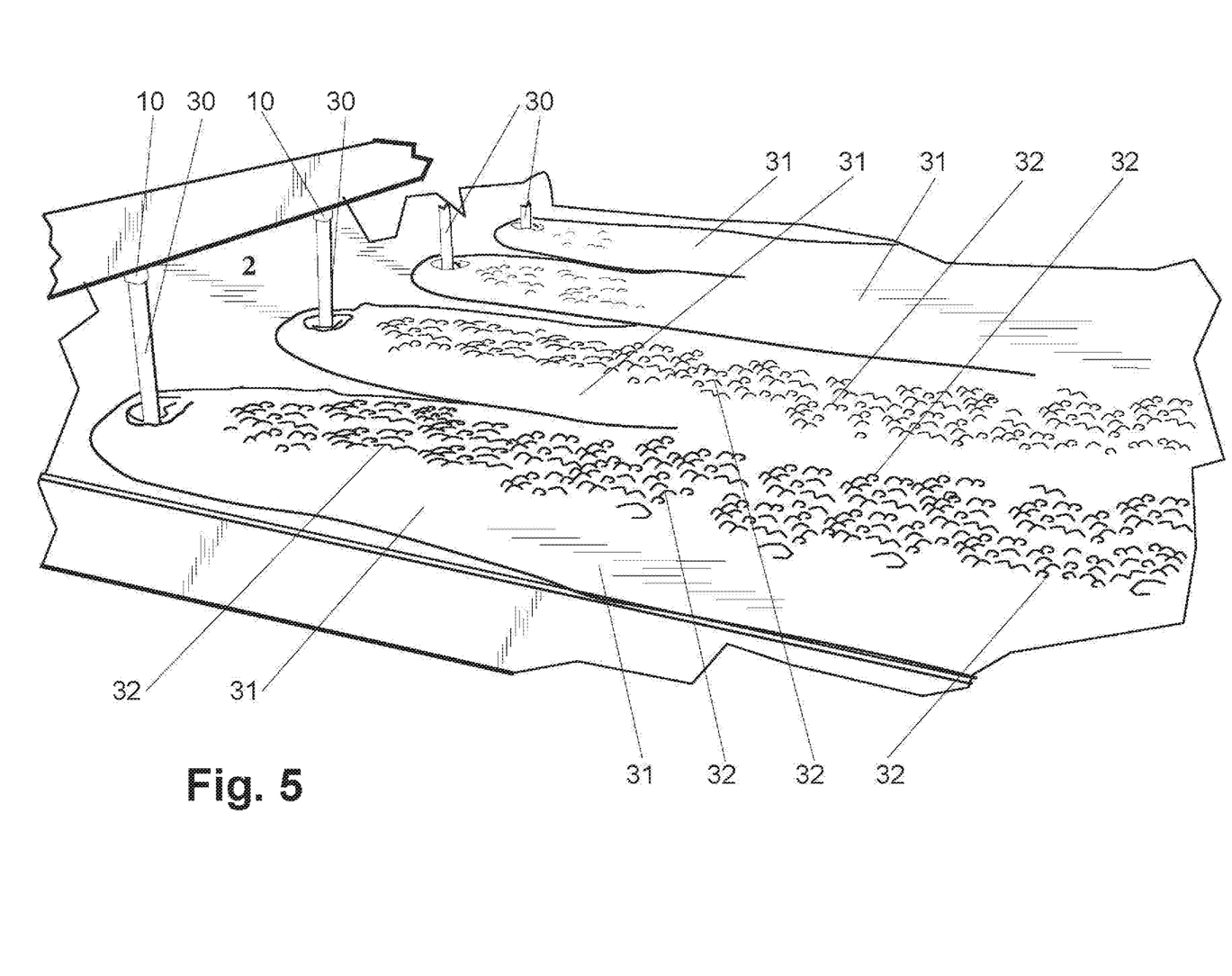
FIG. 5 is an isometric view showing surface bubble formation in a double belt lamination process.

After the process is started and reaches steady-state operation, the layer 4A of reactive foam formulation 4 that is deposited onto the moving metal facing layer is visually examined for the presence of surface bubbles. Jets 30 of reactive foam formulation 4 are discharged from outlets 10 onto bottom facing layer 2 (see FIGS. 1 and 5), forming strips of reactive foam formulation 4 as bottom facing layer 2 moves past openings 10. The strips then combine to form a continuous layer 4A of reactive foam formulation 4. Large numbers of bubbles are present, as shown in FIG. 5.

Figure 6:
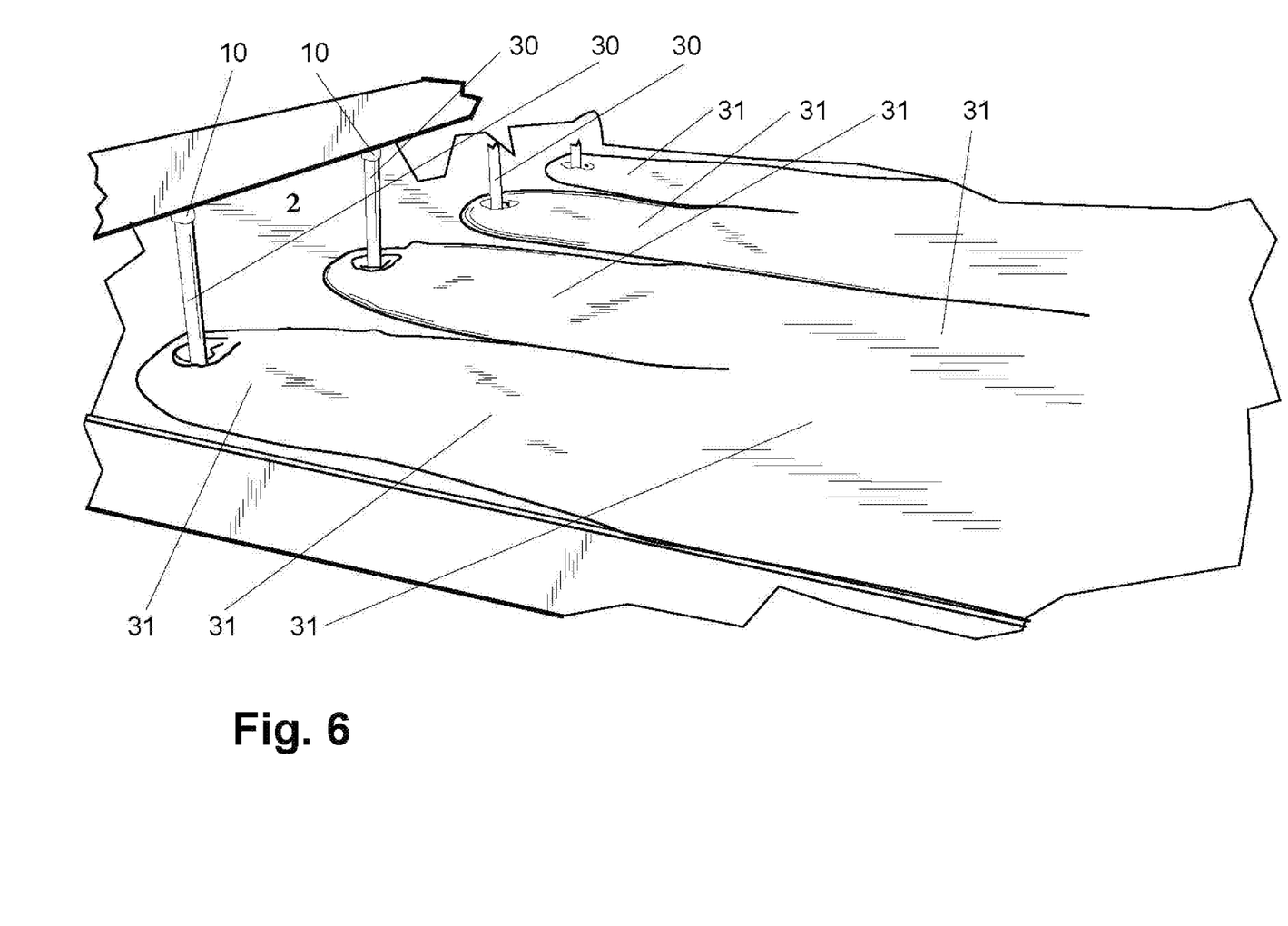
FIG. 6 is an isometric view of the double belt lamination process of FIG. 5, after adjustment of backpressure in the mixing zone of the mixhead via manipulation of an adjustable flow restriction means of the apparatus and process of the invention.

The adjustment screw is then turned inwardly until the distance L (FIG. 4) is 8 mm. The surface bubbles disappear from layer 4A of reactive foam formulation 4 almost immediately, as shown in FIG. 6. When the adjustment screw is backed out again, the surface bubbles reappear.

What is claimed is:

1. A process for making a laminated panel, comprising
   I. combining components comprising at least one polyisocyanate, at least one physical blowing agent, at least one polyol and at least one catalyst in a mixing zone of a mixhead to form a reactive foam formulation;
   II. continuously dispensing the reactive foam formulation onto a moving bottom facing layer to form a layer of reactive foam formulation on the bottom facing layer and
   III. curing the layer of reactive foam formulation on the bottom facing layer to form a laminated panel comprising the bottom facing layer and a polymer foam layer bonded to the bottom facing layer; and
   IV. observing the layer of reactive foam formulation and/or the polymer foam layer for the presence of surface bubbles on a top surface of the layer of the reactive form formulation and/or the polymer foam layer, and when surface bubbles are observed, increasing backpressure in the mixing zone of the mixhead to reduce or eliminate the further formation of surface bubbles.

2. The process of claim 1 wherein at least one the physical blowing agent is present in an amount of at least 12 parts by weight per 100 parts by weight of the at least one polyol.

3. The process of claim 2 wherein the at least one physical blowing agent is a $C_4$-$C_6$ hydrocarbon.

4. The process of claim 2 wherein a top facing layer is applied to the layer of reactive foam formulation before step III, and in step III the layer of reactive foam formulation becomes bonded to the top facing layer.

5. A process for making a laminated panel, comprising
   I. continuously dispensing a reactive foam formulation onto a moving bottom facing layer through an apparatus for forming and dispensing a fluid mixture by introducing components comprising at least one polyisocyanate, at least one physical blowing agent, at least one polyol and at least one catalyst into the mixing zone of the mixhead through the multiple inlets of the mixhead, mixing the components in the mixing zone to form the reactive foam formulation and transferring the reactive foam formulation out of the mixhead outlet and then through the distribution system and out of the outlets of the distribution system onto the moving bottom facing layer to form a layer of reactive foam formulation on the bottom facing layer and
   II. curing the layer of reactive foam formulation on the bottom facing layer to form a laminated panel comprising the bottom facing layer and a polymer foam layer bonded to the bottom facing layer; and III. observing the layer of reactive foam formulation and/or the polymer foam layer for the presence of surface bubbles on a top surface of the layer of the reactive foam formulation and/or the polymer foam layer, and when surface bubbles are observed, increasing backpressure in the mixing zone of the mixhead through manipulation of the adjustable flow restriction means to reduce or eliminate the formation of surface bubbles;

wherein the apparatus comprises:

a) a mixhead that includes:
  i) multiple inlets for the introduction of starting materials for mixing in the mixhead, the multiple inlets being in fluid communication with
  ii) a mixing zone in which starting materials introduced into the mixhead through the multiple inlets are combined to form a fluid mixture, the mixing zone being in fluid communication with
  iii) a mixhead outlet through which a fluid mixture formed in the mixing zone is removed from the mixhead, the mixhead outlet being in fluid communication with b) a distribution system for distributing and dispensing a fluid mixture exiting the mixhead outlet, said distribution system including i) a conduit system including at least one branch point at which the conduit system is divided to define multiple flowpaths and ii) outlets at termini of the multiple flowpaths of the conduit system for dispensing the fluid mixture from the distribution system;

c) adjustable flow restriction means positioned downstream of the mixing zone of the mixhead and at or upstream of the at least one branch point of the conduit system, wherein the adjustable flow restriction means is operable to increase and decrease backpressure in the mixing zone of the mixhead.

6. The process of claim 5 wherein the at least one physical blowing agent is present in an amount of at least 12 parts by weight per 100 parts by weight of the at least one polyol.

7. The process of claim 6 wherein the at least one physical blowing agent is a $C_4$-$C_6$ hydrocarbon.

8. The process of claim 6 wherein a top facing layer is applied to the layer of reactive foam formulation before step II, and in step II the layer of reactive foam formulation becomes bonded to the top facing layer.

* * * * *